United States Patent
Williams et al.

(10) Patent No.: US 11,048,617 B2
(45) Date of Patent: Jun. 29, 2021

(54) METHOD OF ACCESSING METADATA WHEN DEBUGGING A PROGRAM TO BE EXECUTED ON PROCESSING CIRCUITRY

(71) Applicant: Arm Limited, Cambridge (GB)

(72) Inventors: Michael John Williams, Ely (GB); Graeme Peter Barnes, Cambridge (GB); John Michael Horley, Hauxton (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/971,415

(22) PCT Filed: Jan. 17, 2019

(86) PCT No.: PCT/GB2019/050123
§ 371 (c)(1),
(2) Date: Aug. 20, 2020

(87) PCT Pub. No.: WO2019/166759
PCT Pub. Date: Sep. 6, 2019

(65) Prior Publication Data
US 2021/0034503 A1 Feb. 4, 2021

(30) Foreign Application Priority Data
Feb. 27, 2018 (GB) .................... 1803168

(51) Int. Cl.
*G06F 11/36* (2006.01)
(52) U.S. Cl.
CPC ................ *G06F 11/3656* (2013.01)
(58) Field of Classification Search
None
See application file for complete search history.

(56) References Cited

U.S. PATENT DOCUMENTS

| 6,145,123 | A | 11/2000 | Torrey et al. |
| 9,053,233 | B2 | 6/2015 | Moyer |

(Continued)

FOREIGN PATENT DOCUMENTS

| GB | 2 350 214 | 11/2000 |

OTHER PUBLICATIONS

International Search Report for PCT/GB2019/050123 dated May 17, 2019, 4 pages.

(Continued)

*Primary Examiner* — Philip Wang
(74) *Attorney, Agent, or Firm* — Nixon & Vanderhye P.C.

(57) ABSTRACT

A technique is provided for accessing metadata when debugging a program to be executed on processing circuitry. The processing circuitry operates on data formed of data granules having associated metadata items. A method of operating a debugger is provided that comprises controlling the performance of metadata access operations when the debugger decides to access a specified number of metadata items. In particular, the specified number is such that the metadata access operation needs to be performed by the processing circuitry multiple times in order to access the specified number of metadata items. Upon deciding to access a specified number of metadata items, the debugger issues at least one command to cause the processing circuitry to perform a plurality of instances of the metadata access operation in order to access at least a subset of the specified number of metadata items. The number of metadata items accessed by each instance of the metadata access operation is non-deterministic by the debugger from the metadata access operation. However, the at least one command is such that the plurality of instances of the metadata access operation are performed by the processing circuitry without the debugger interrogating the processing circuitry between (Continued)

each instance of the metadata access operation to determine progress in the number of metadata items accessed. Such an approach can significantly improve the efficiency of performing such accesses to metadata items under debugger control.

23 Claims, 15 Drawing Sheets

(56) References Cited

U.S. PATENT DOCUMENTS

| 2009/0254883 | A1* | 10/2009 | Munson | G06F 11/3624 |
| | | | | 717/124 |
| 2011/0320439 | A1* | 12/2011 | Gruschko | G06F 16/211 |
| | | | | 707/722 |
| 2018/0365130 | A1* | 12/2018 | Hintsala | G06F 11/3664 |
| 2020/0394119 | A1* | 12/2020 | Williams | G06F 11/3037 |

OTHER PUBLICATIONS

Written Opinion of the ISA for PCT/GB2019/050123 dated May 17, 2019, 6 pages.

Combined Search and Examination Report for GB1803168.2, dated Sep. 7, 2018, 5 pages.

Lee et al., "Efficient Security Monitoring with the Core Debug Interface in an Embedded Processor", ACM Transactions on Design Automation of Electronic Systems, May 27, 2016, vol. 22, No. 1, 29 pages.

Watson et al., "CHERI: A Hybrid Capability-System Architecture for Scalable Software Compartmentalization", 2015 IEEE Symposium on Security and Privacy, May 17, 2015, pp. 20-37.

* cited by examiner

```
Software code sequence for reading multiple metadata items (tags)

MOV Xbase, #pointer              //set base address
MOV Xaddr, Xbase                 //initialise address to base address
MOV Xtags, #0                    //initialise tags register loop
Gettagblock Xtmp, [Xaddr]!       //address is adjusted based on number of metadata
                                 //items retrieved
ORR Xtags, Xtags, Xtmp           //update tags register
TST Xaddr is not at the end      //final address will depend on number of metadata
              of block           //items to be retrieved, e.g. the number that can
                                 //fit in the tags register BNE loop
```

FIG. 6A

Debugger initiated command sequence repeated to read multiple metadata items (tags):

Set base address (MOV Xbase, #pointer)
Following command sequence is repeated

Construct address + offset (ADD Xaddr, Xbase, #offset)    //address computed
                                                          //explicitly for
                                                          //current iteration
Get a number of tags (GetTagBlock Xtmp, [Xaddr]!)         //updated Xaddr not
                                                          //used
Merge with previous tags (ORR Xtags, Xtags, Xtmp)         //update tags register These three commands are reissued for each instance of metadata access operation to be performed – constraining info used to determine a plurality of instances of command sequence that can be issued without interrogating processing circuitry. Constraining info also used to determine offset value.

FIG. 6B

```
CAPABILITIES (1 bit of metadata for each 16 bytes of data)
Addr    | Data
0x1000: |         16 bytes of data, 1 bit of metadata
0x1010: |         16 bytes of data, 1 bit of metadata
0x1020: |         16 bytes of data, 1 bit of metadata ALLOCATION TAGGING (4 bits of metadata for each 16 bytes of data)
Addr    | Data
0x1000: |         16 bytes of data, 4 bits of metadata
0x1010: |         16 bytes of data, 4 bits of metadata
0x1020: |         16 bytes of data, 4 bits of metadata
```

FIG. 7B

Debugger initiated command sequence to write multiple metadata items (tags):

Set a register with a number of tags (MRS Xtags, DTR)
Set base address (MOV Xbase, #pointer)

Following command sequence is repeated:

Construct address + offset (ADD Xaddr, Xbase, #offset)   //address computed
                                                         //explicitly for
                                                         //current iteration
Set a number of tags (SetTagBlock Xtags, [Xaddr]!)       //updated Xaddr not
                                                         //used The above two commands are reissued for each instance of metadata access operation to be performed - constraining info is used to determine a plurality of instances of the command sequence that can be issued without interrogating processing circuitry. Constraining info also used to determine offset value.

FIG. 8

Alternative where address generation command not needed

GetTagBlock Xtmp, [Xaddr]!
ORR Xtags, Xtags, Xtmp

Repeat this for N repetitions.
However, GetTagBlock will loop Xaddr back to Xbase if an instance ever tries to cross the top boundary of the chunk of data.

e.g. 1kbyte of data for 64 tags, with loopback (debugger scenario)
0x1000
0x1080
0x1100
0x1180
0x1200
0x1280
0x1300
0x1380
0x1000 (looped back to 0x1000)

e.g. 1kbyte of data for 64 tags, without loopback (software scenario)
0x1000
0x1080
0x1100
0x1180
0x1200
0x1280
0x1300
0x1380
0x1400 (continued to 0x1400)

FIG. 9B

METHOD OF ACCESSING METADATA WHEN DEBUGGING A PROGRAM TO BE EXECUTED ON PROCESSING CIRCUITRY

This application is the U.S. national phase of International Application No. PCT/GB2019/050123 filed Jan. 17, 2019 which designated the U.S. and claims priority to GB Patent Application No. 1803168.2 filed Feb. 27, 2018, the entire contents of each of which are hereby incorporated by reference.

The present disclosure relates to a technique for accessing metadata when debugging a program to be executed on processing circuitry.

In particular, the processing circuitry may be arranged to operate on data formed of data granules having associated metadata items. The size of the data granules may vary dependent on implementation, and indeed the size of the metadata items associated with each data granule may also vary dependent on implementation.

When debugging a program to be executed on processing circuitry, the debugger at certain points in time may wish to access a series of the metadata items relating to a corresponding series of data granules. For example, it may be desired to read the values of each of those metadata items. Alternatively it may be desired to perform a write operation to update the current value of each of those metadata items.

The processing circuitry may support performance of a metadata access operation to access metadata items, and the debugger can issue a command to the processing circuitry to cause it to perform such a metadata access operation. However, in accordance with known mechanisms, the debugger will not know how many metadata items will be accessed by the processing circuitry when executing the metadata access operation, and accordingly it is necessary for the debugger to interrogate the processing circuitry after performance of the metadata access operation to determine how many metadata items were accessed, and accordingly whether any further iterations of the metadata access operation are required in order to access the total number of metadata items that the debugger wishes to access.

However, the process of interrogating the processing circuitry after performance of each metadata access operation significantly impacts performance, and accordingly it would be desirable to provide a more efficient mechanism for enabling a debugger to access a specified number of metadata items.

In a first example arrangement, there is provided a method of operating a debugger to debug a program to be executed on processing circuitry, the processing circuitry operating on data formed of data granules having associated metadata items, the method comprising: deciding to access a specified number of metadata items, where the specified number is such that a metadata access operation needs to be performed by the processing circuitry multiple times in order to access the specified number of metadata items; and issuing at least one command to the processing circuitry to cause the processing circuitry to perform a plurality of instances of the metadata access operation in order to access at least a subset of the specified number of metadata items, where the number of metadata items accessed by each instance of the metadata access operation is non-deterministic by the debugger from the metadata access operation, and the at least one command is such that the plurality of instances of the metadata access operation are performed by the processing circuitry without the debugger interrogating the processing circuitry between each instance of the metadata access operation to determine progress in the number of metadata items accessed.

In another example arrangement there is provided a computer program product comprising a non-transitory machine-readable storage medium on which is stored program instructions which, when executed by a computer processor, cause the computer processor to operate as a debugger to perform a method of debugging a program to be executed on processing circuitry, the processing circuitry operating on data formed of data granules having associated metadata items, the method comprising: deciding to access a specified number of metadata items, where the specified number is such that a metadata access operation needs to be performed by the processing circuitry multiple times in order to access the specified number of metadata items; and issuing at least one command to the processing circuitry to cause the processing circuitry to perform a plurality of instances of the metadata access operation in order to access at least a subset of the specified number of metadata items, where the number of metadata items accessed by each instance of the metadata access operation is non-deterministic by the debugger from the metadata access operation, and the at least one command is such that the plurality of instances of the metadata access operation are performed by the processing circuitry without the debugger interrogating the processing circuitry between each instance of the metadata access operation to determine progress in the number of metadata items accessed.

The present technique will be described further, by way of illustration only, with reference to examples thereof as illustrated in the accompanying drawings, in which:

FIG. 6A illustrates an example software code sequence that may be executed by the processor in a non-debug mode in order to access a plurality of metadata items, whilst FIG. 6B illustrates an example command sequence that may be issued by the debugger when seeking to access metadata items whilst the processor is in a debug mode of operation;

FIGS. 7A and 7B illustrate how metadata items may be provided in association with each data granule;

FIG. 8 illustrates a debugger initiated command sequence that may be used to write to multiple metadata items in one example arrangement;

FIGS. 9A and 9B illustrate an address wrapping function that may be implemented in one example arrangement;

Figure 1:
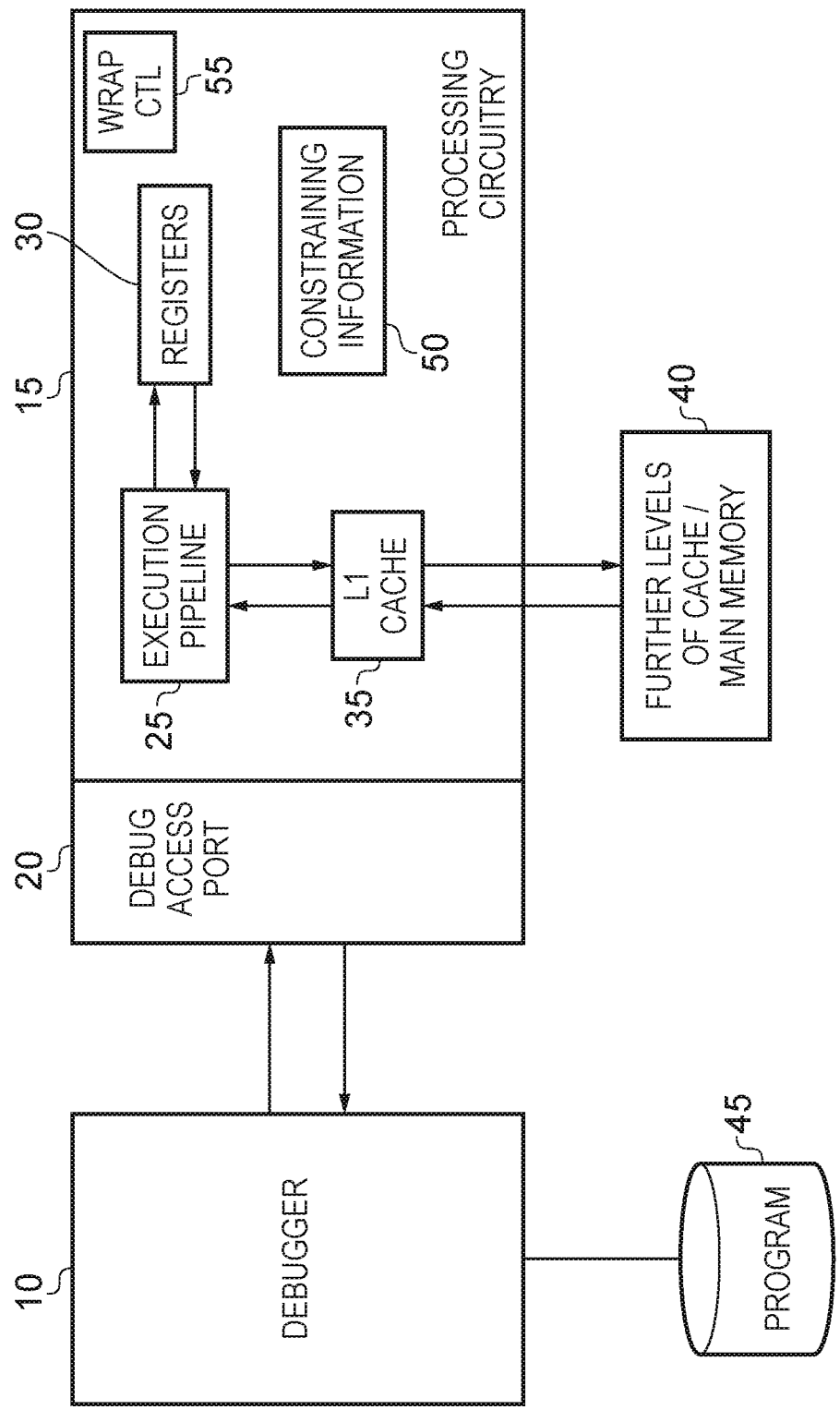
FIG. 1 is a block diagram of a system in accordance with one example.

In accordance with one example arrangement, a method of operating a debugger to debug a program to be executed on processing circuitry is provided, and in particular a method is provided for controlling the debugger's interactions with the processing circuitry when the debugger decides that it wishes to access a specified number of metadata items, where the specified number is such that a metadata access operation needs to be performed by the processing circuitry multiple times in order to access the specified number of metadata items. It should be noted that the use of the metadata access operation may not be the only mechanism available to the debugger to access metadata items, but for the purposes of the present disclosure, it is the metadata access operation approach that is used by the debugger to seek to access the specified number of metadata items.

In accordance with one example arrangement, once the debugger has determined a need to access a specified number of metadata items, it is arranged to issue at least one command to the processing circuitry to cause the processing circuitry to perform a plurality of instances of the metadata access operation in order to access at least a subset of the specified number of metadata items. The number of metadata items accessed by each instance of the metadata access operation is non-deterministic by the debugger from the metadata access operation, and hence prior to the metadata access operation being performed by the processing circuitry, the debugger cannot determine from the metadata access operation itself how many metadata items will be accessed by the processing circuitry when it executes that metadata access operation.

However, in accordance with the described mechanism, the at least one command is such that the plurality of instances of the metadata access operation are performed by the processing circuitry without the debugger interrogating the processing circuitry between each instance of the metadata access operation to determine progress in the number of metadata items accessed. In particular, the one or more commands that are issued can be arranged so that the plurality of instances of the metadata access operation can be performed without the prospect of the processing circuitry accessing metadata items outside of the specified number that it is desired to access. Since the plurality of instances of the metadata access operation can be performed without the debugger needing to interrogate the processing circuitry between each instance, this can significantly improve performance when accessing multiple metadata items under debugger control.

In one example, at least one access indicator is provided to indicate constraining information about a number of metadata items accessed by each instance of the metadata access operation, and the plurality of instances of the metadata access operation performed in response to the at least one command is determined with reference to the at least one access indicator. The at least one access indicator can take a variety of forms. For example, it may be some predetermined information that is independent of the particular implementation details of the processing circuitry. Alternatively, the at least one access indicator may be specifiable within a storage element such as an identification register, and can indicate constraining information that takes into account certain implementation details of the processing circuitry. In one example arrangement, the debugger itself can reference the at least one access indicator, and issue a sequence of commands that directly identify the plurality of instances of the metadata access operation to be performed. However, in an alternative approach, there may be operation generation circuitry within the processing circuitry that can access the constraining information, and respond to a command issued by the debugger to determine the plurality of instances of the metadata access operation to be performed, and to control performance of the required operations.

In one example, the at least one access indicator is sufficient to enable the at least one command issued by the debugger to the processing circuitry to cause the processing circuitry to perform, as the plurality of instances of the metadata access operation, a sufficient number of instances of the metadata access operation to access all of the specified number of metadata items. Hence, in such an arrangement it can be ensured that by the time the plurality of instances of the metadata access operation have been performed, all of the required metadata items will have been accessed. Since this can occur without the debugger needing to interrogate the processing circuitry, then the entire process can be performed without any interrogation of the processing circuitry by the debugger to determine progress, thereby providing a particularly efficient implementation.

As an example of an access indicator that may be used in such a way, the access indicator may provide a generic minimum indication non-specific to implementation details of the processing circuitry, which indicates a minimum number of metadata items accessed by each instance of the metadata access operation. As a simple example, it may be assumed that only a single metadata item is accessed when performing each instance of the metadata access operation. Hence, in that example the plurality of instances of the metadata access operation performed will be equal to the specified number of metadata items that the debugger wishes to access. As will be discussed in more detail later, by appropriate control of the address used for each instance of the metadata access operation, it can be ensured that no instances of the metadata access operation access metadata items outside of the address range associated with the specified number of metadata items.

As another example of a suitable access indicator that can enable all of the specified number of metadata items to be accessed by performing the plurality of instances of the metadata access operation, the access indicator may provide an implementation minimum indication for the processing circuitry, indicating a minimum number of metadata items accessed by each instance of the metadata access operation. This may for example identify as the minimum number a number greater than one, hence reducing the number of instances of the metadata access operation that need to be performed. Again, by appropriate control of the addressing mechanism used by the metadata access operation, it can be ensured that only metadata items within the address range associated with the specified number are accessed.

As another example of an access indicator that can be used, the access indicator may provide an exact indication of the number of metadata items accessed by each instance of the metadata access operation. Again, such a form of access indicator can enable the one or more commands sent to the processing circuitry to trigger performance of a plurality of instances of the metadata access operation that are sufficient to access all of the specified number of metadata items, without the need for the debugger to interrogate the processing circuitry between each instance of the metadata access operation.

In some example arrangements, the access indicator may assist in determining a plurality of instances of the metadata access operation that can be performed without the debugger needing to interrogate the processing circuitry, but the access indicator may not provide sufficient information that it will be known for certain whether all of the specified number of metadata items have been accessed by the time the plurality of instances of the metadata access operation have been performed. For example, the at least one access indicator may provide an implementation maximum indication for the processing circuitry, indicating a maximum number of metadata items accessed by each instance of the metadata access operation.

With such a form of access indicator, a plurality of instances of the metadata access operation can again be determined that can be performed without the debugger needing to interrogate the processing circuitry between each instance. However, once that plurality of instances of the metadata access operation have been performed, further checks will be necessary in order to determine whether all of the specified number of metadata items have been accessed or not, and hence whether any additional instances of the metadata access operation are required.

In particular, in one example arrangement, the at least one command issued by the debugger to the processing circuitry causes the processing circuitry to perform, as the plurality of instances of the metadata access operation, a number of instances M, where M is equal to the specified number of metadata items divided by the maximum number of metadata items accessed by each instance of the metadata access operation. When the processing circuitry has performed the plurality of instances of the metadata access operation, the debugger may then be arranged to interrogate the processing circuitry to determine progress in the number of metadata items accessed, in order to determine whether further instances of the metadata access operation are required.

In one example arrangement, the at least one command issued by the debugger causes an address to be determined by the processing circuitry for each instance of the metadata access operation, the address being used to identify one or more metadata items accessed during performance of the associated instance of the metadata access operation. It may be the case that when the metadata access operation is performed by the processing circuitry, this automatically causes an address indication within the processing circuitry to be updated, taking into account the number of metadata items accessed. However, since the plurality of instances of the metadata access operation are to be performed without the debugger interrogating the processing circuitry between each instance of the metadata access operation, that address is not used directly, and instead the one or more commands issued by the debugger cause the address to be determined for each instance of the metadata access operation. By such an approach, it can be ensured that when the plurality of instances of the metadata access operation are performed, metadata items will not be accessed that are outside of an address range associated with the specified number of metadata items that the debugger is seeking to access.

There are a number of ways in which the address for each instance of the metadata access operation can be determined, but in one embodiment the address is determined having regard to the at least one access indicator. For example, the address may be used to identify the data granule associated with a metadata item. If, based on the access indicator, an assumption is made that L metadata items are accessed by each instance of the metadata access operation, then the address can be incremented by L times the data granule size between each iteration in one example implementation.

There are a number of ways in which the address can be generated for each instance of the metadata access operation. However, in one embodiment, the at least one command comprises a command sequence for each instance of the metadata access operation, the command sequence identifying a sequence of operations comprising at least the corresponding instance of the metadata access operation, and an address generation operation to determine the address to be used by the corresponding instance of the metadata access operation. Hence, the command sequence will identify a sequence of operations that includes at least an address generation operation and the corresponding instance of the metadata access operation. Other operations may also be included within the command sequence, depending on the nature of the access being performed, for example whether metadata items are being read, or written to.

Whilst in the above example arrangement, the command sequence identifies a specific address generation operation performed to determine the address, in an alternative arrangement it may be possible to omit such an address generation operation, and instead rely on an automatic update of the address performed within the processing circuitry when the instance of the metadata access operation is performed. In particular, in one example arrangement, an address space region is identified based on the specified number of metadata items to be accessed. Then, during performance of a current instance of the metadata access operation instigated by the debugger, the processing circuitry is arranged to generate an updated address to be used as the address for a next instance of the metadata access operation, the updated address being generated by modifying the address used by the current instance to take into account the number of metadata items accessed by the current instance, but employing a wrapping function to wrap from one end of the address space region to another end of the address space region as required to ensure that the updated address remains within the address space region. By ensuring that the wrapping function is employed in such situations, it can be ensured that even though the plurality of instances of the metadata access operation are performed without the debugger interrogating the processing circuitry for progress, no access will be made to non-intended metadata items, and in particular the various instances of the metadata access operation will be constrained so as to only access metadata items within the address range associated with the specified number of metadata items of interest.

Such wrapping functionality may not however be appropriate when the processing circuitry is performing such metadata access operations during normal execution of a program. In particular, a program may include a metadata access instruction which, when executed by the processing circuitry, causes the processing circuitry to perform the metadata access operation. However, in a non-debug mode, it may be preferable for no wrapping function constraint to be placed on the address incrementing process. Accordingly, in one example arrangement, in a non-debug mode of operation of the processing circuitry, performance of the metadata access operation causes the processing circuitry to perform the metadata access operation such that, when generating the updated address, the wrapping function is disabled.

In one example arrangement, the debugger may be arranged to set a control storage element within the processing circuitry to selective disable the wrapping function. By such an approach the wrapping function can be turned on and off as required, under the control of the debugger. In one example, when exiting debug mode, the debugger could set the control storage element so as to disable the wrapping function, so that when the processing circuitry operates in a standard mode of operation, no such wrapping function constraint is placed on the execution of metadata access operations.

In one example arrangement, the at least one command comprises one or more commands for each instance of the metadata access operation. Hence, the debugger will directly control performance of each instance of the metadata access operation by issuing an associated one or more commands.

However, in an alternative arrangement, the at least one command issued by the debugger is processed by operation generation circuitry within the processing circuitry, in order to create the operations required for the processing circuitry to perform the plurality of instances of the metadata access operation. In one example scenario, it may be sufficient for the debugger to issue a single command to the operation generation circuitry, with the operation generation circuitry within the processing circuitry then creating the required operations to be performed by the processing circuitry in order to perform the plurality of instances of the metadata access operation.

The type of access operation performed can be varied. For example, the access operation may be a read operation, such that performance of the metadata access operation by the processing circuitry the multiple times causes the specified number of metadata items to be retrieved and stored into a chosen register. Thereafter, the debugger can access that chosen register in order to obtain all of the metadata items.

In an alternative example, the access operation may be a write operation such that performance of the metadata access operation by the processing circuitry the multiple times causes values of the specified number of metadata items to be updated using metadata values stored in a chosen register. In such a case, the chosen register can be populated with the required values prior to initiating performance of the multiple instances of the metadata access operation.

There are a number of ways in which the specified number of metadata items that are to be accessed can be determined. However, in one example the specified number is determined by the number of metadata items that can be stored in the chosen register. Hence, purely by way of example, if the chosen register is a 64-bit register, and each metadata item is a single bit, then the specified number may be 64.

Each metadata item may comprise one or more bits depending on the form of the metadata. As a specific example, each metadata item may be a capability tag identifying whether the associated data granule specifies a capability. There is increasing interest in capability-based architectures in which certain capabilities are defined for a given process, and an error can be triggered if there is an attempt to carry out operations outside of the defined capabilities. A bounded pointer is an example of a capability. The pointer itself may point to, or be used to determine, the address of a data value to be accessed or an instruction to be executed, for example. However, the pointer may also have associated range information which indicates an allowable range of addresses when using the pointer. This can be useful, for example, for ensuring that the address determined from the pointer remains within certain bounds to maintain security or functional correctness of behaviour. Within such capability-based systems, it is important to know whether any particular data granule relates to a capability or to general purpose data, and the capability tag can be used for this purpose.

As another example of a metadata item, the metadata item may be an allocation tag identifying an allocation policy of the associated data granule. Such an allocation tag can also be referred to as a guard tag. One approach for protecting against certain memory usage errors may be to provide guard tags which are stored in a memory system in association with blocks of one or more memory locations (the data in those one or more memory locations being the data granule). When a tag-guarded memory access operation is requested based on a target address identifying the particular addressed location in the memory system, memory access circuitry may compare an address tag that is associated with the target address with a guard tag that is stored in the memory system in association with a block of one or more memory locations which includes the addressed location identified by the target address. The memory access circuitry may generate an indication of whether a match is detected between the guard tag and the address tag. This indication can be used to control whether the memory access is allowed to succeed or whether subsequent operations can succeed, or could merely be reported while allowing memory accesses to continue as normal.

It will be appreciated that the debugger used to implement the techniques described herein can take a variety of forms, and could for example be dedicated hardware, or alternatively could be formed by software executing on a general purpose computer. Accordingly, a computer program product may be provided on which is stored program instructions which, when executed by a computer, cause the computer to operate as the earlier-mentioned debugger.

Particular examples will now be described with reference to the Figures.

FIG. 1 is a block diagram of a system in accordance with one example arrangement. A debugger 10 is provided to debug a program 45 that is to be executed on processing circuitry 15. The processing circuitry 15 has a debug access port 20 via which the debugger 10 can issue commands to the processing circuitry in order to cause the processing circuitry to perform certain operations. The processing circuitry can take a variety of forms, but in one example arrangement is a processor core such as a central processing unit (CPU). An execution pipeline 25 is provided for performing operations on data. During performance of those operations, the execution pipeline 25 has access to working registers 30 from which it can read data values to be processed by the operations, and to which it can write the results of those operations. The execution pipeline 25 has access to a memory system consisting of various levels of cache and main memory. In the illustrated example, a level one cache 35 is provided within the processing circuitry 15, which is then coupled to one or more further levels of cache and main memory 40. Load operations can be performed by the execution pipeline 25 in order to load data from memory 35, 40 into the registers 30, and in addition store operations can be performed by the execution pipeline in order to store data from the registers 30 back to the memory system 35, 40.

During a normal, non-debug, mode of operation, the operations performed by the execution pipeline are controlled by the instructions forming a program that is executed on the processing circuitry. However, in a debug mode of operation, the operations performed by the execution pipeline can be controlled directly by commands issued from the debugger 10 via the debug access port 20.

The data that the processing circuitry 15 operates on is formed of data granules having associated metadata items. The size of the data granules can vary dependent on implementation or on some configurable behaviour, but in particular examples discussed hereafter it will be assumed that the data granules are 16 bytes (128 bits) in size. Further, the number of bits forming the associated metadata items can vary dependent on implementation or on some configurable behaviour, but two specific examples will be discussed later where the metadata items are either one bit or four bits in size.

When debugging a program to be executed on the processing circuitry, it is sometimes useful for the debugger to access a series of metadata items associated with the corresponding series of data granules. For example, it may be desired to read the values of those metadata items, or to perform write operations in order to update the values of those metadata items. The processing circuitry 15 supports performance of a metadata access operation to access the metadata items, but the debugger cannot determine from the metadata access operation itself, prior to that metadata access operation being performed by the processing circuitry, how many metadata items will be accessed when the metadata access operation is performed. The techniques described herein provide an efficient mechanism for the debugger to issue one or more commands to the processing circuitry to cause multiple instances of the metadata access operation to be performed by the processing circuitry, in particular reducing the extent to which the debugger needs to interrogate the processing circuitry for progress with regards to the number of metadata items accessed.

As will be discussed in more detail later, constraining information 50 may be used to provide certain information about the number of metadata items accessed by each instance of the metadata access operation, and that constraining information can be used when determining how many instances of the metadata access operation can safely be initiated under debugger control without the debugger needing to interrogate the processing circuitry between each instance of the metadata access operation to determine progress in the number of metadata items accessed. The constraining information may take the form of some predetermined information that can be assumed by the debugger, or instead an explicit storage, such as an identification register, may be provided in which such constraining information can be specified, thus allowing the constraining information to be specific to the particular implementation of the processing circuitry.

By using the constraining information, it is possible for the debugger to issue one or more commands that then cause the plurality of instances of the metadata access operation to be performed without the prospect of the processing circuitry accessing metadata items outside of the specified number of metadata items of interest. In one example arrangement, this is achieved through control of the memory address used by each instance of the metadata access operation. In one particular example, this is achieved by the address being generated for each iteration based on the command sequence issued from the debugger. However, in an alternative example, use is made of an updated address that is directly generated by the processing circuitry following performance of each instance of the metadata access operation, based on the number of metadata items accessed, but by placing a wrapping constraint on that address generation process. This ensures that, when the plurality of instances of the metadata access operation are performed without any interrogation by the debugger as to progress between performance of each instance, the addresses used will be constrained so that only metadata items within the specified number of metadata items of interest will be accessed. As will be discussed in more detail later, a control storage element 55 can in one example arrangement be provided whose value can be set under the control of the debugger, so as to selectively enable the wrapping control functionality whilst in debug mode, or to selectively disable the wrapping control functionality when the processing circuitry is not operating in debug mode.

Figure 2:
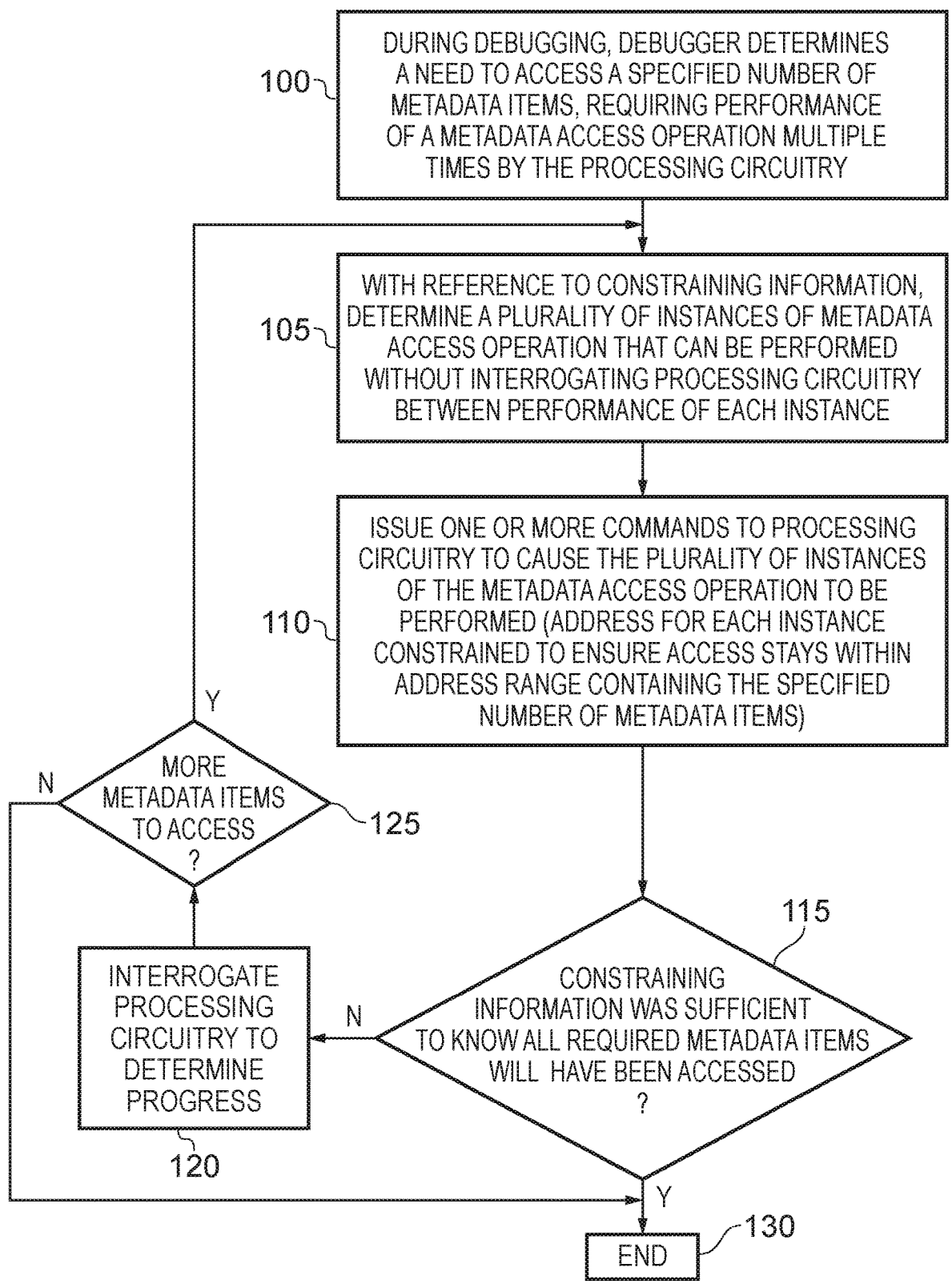
FIG. 2 is a flow diagram illustrating operation of the debugger to control performance of metadata access operations in accordance with one example arrangement.

FIG. 2 is a flow diagram illustrating the operation of the debugger 10 when controlling performance of metadata access operations by the processing circuitry 15. At step 100, during the debugging process, the debugger determines a need to access a specified number of metadata items. In particular, the specified number is such that the metadata access operation will need to be performed multiple times by the processing circuitry in order to access that specified number of metadata items. As mentioned earlier, the number of metadata items accessed by the processing circuitry each time the metadata access operation is performed is non-deterministic to the debugger 10 from the metadata access operation itself. However, as indicated at step 105, with reference to the constraining information 50, a plurality of instances of the metadata access operation can be determined that can be performed without the debugger needing to interrogate the processing circuitry between performance of each instance. In particular, given the constraining information, it can be determined that it is safe for that plurality of instances of the metadata access operation to be performed without any prospect of accessing metadata items outside of the specified number of interest. In one example arrangement, this is achieved by appropriate control of the address generation process used to identify the address used by each instance of the metadata access operation.

Once the plurality of instances has been determined, then at step 110 one or more commands are issued by the debugger to the processing circuitry 15 to cause the plurality of instances of the metadata access operation to be performed. As mentioned above, the address for each instance is constrained to ensure that the access stays within the address range containing the specified number of metadata items.

Depending on the type of constraining information available, it may be known whether the specified number of metadata items will all have been accessed by the time the plurality of instances of the metadata access operation have been performed. Accordingly, at step 115 it is determined whether the constraining information was sufficient to know that all required metadata items will have been accessed. If so, the process ends at step 130. However, if not, then the process proceeds to step 120 where the debugger issues one or more commands via the debug access port 20 in order to interrogate the processing circuitry 15 to determine progress with regards to the number of metadata items accessed. As a result, it is then determined at step 125 whether more metadata items need to be accessed or not. If not, the process ends at step 130. However, otherwise the process returns to step 105 in order to determine a number of further instances of the metadata access operation that can be performed without interrogating the processing circuitry. The process illustrated in FIG. 2 can then continue until it is known that all of the specified number of metadata items have been accessed. It should be noted that on a final iteration through the process of FIG. 2, it may be the case at step 105 that only a single further instance of the metadata access operation is needed. Purely by way of specific example, if at step 125 it is determined that one remaining metadata item needs to be accessed, and the constraining information indicates that at least one metadata item will be accessed by each instance of the metadata access operation, then at that stage only a single metadata access operation will need to be performed during the final iteration of steps 105, 110.

Figure 3:
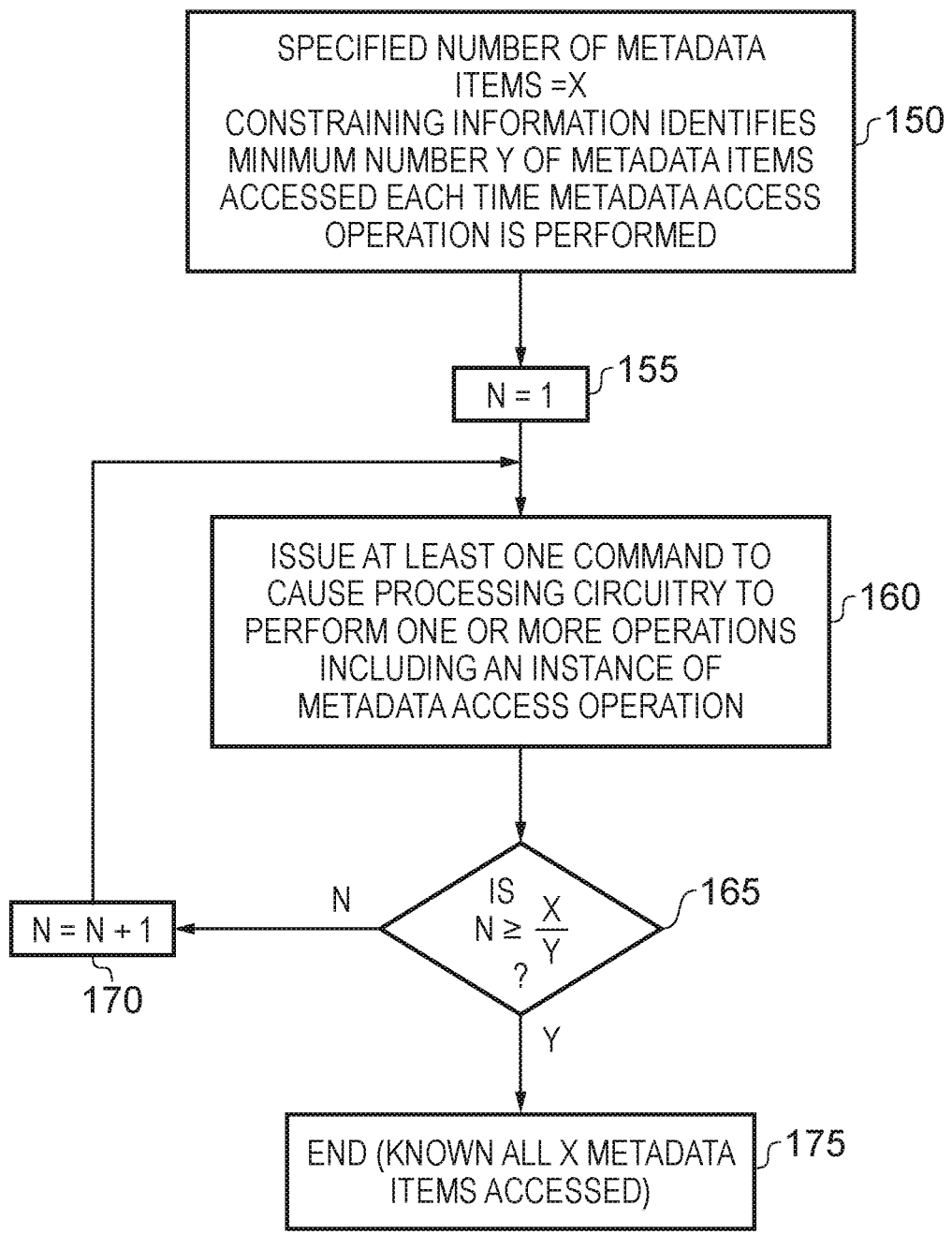
FIGS. 3 to 5 are flow diagrams illustrating operation of the debugger for three different forms of constraining information.

The constraining information can take a variety of forms. FIG. 3 illustrates the process for one example scenario where the constraining information identifies a minimum number Y of metadata items that are accessed each time the metadata access operation is performed. Using such a form of constraining information, it is possible to construct a plurality of instances of the metadata access operation that can be performed without interrogating the processing circuitry between performance of each instance, and for which it is known that all of the specified number of metadata items will have been accessed by the time that plurality of instances of the metadata access operation have been performed. This is illustrated in FIG. 3, where it is assumed at step 150 that the specified number of metadata items being accessed is "X". With regards to the minimum number "Y", this may be for example some generic minimum indication non-specific to the implementation details of the processing circuitry. Purely by way of example, it may for example be determined that at least one metadata item will be accessed each time the metadata access operation is performed. Alternatively, the value Y might be an implementation minimum indication having regards to the processing circuitry in question, and hence might potentially be a larger value than any generic minimum indication. Hence, purely by way of specific example, the minimum indication in that instance might identify that at least two metadata items will be accessed each time the metadata access operation is performed.

At step 155, an iteration count N is set equal to one, whereafter the process proceeds to step 160 where at least one command is issued by the debugger 10 to the processing circuitry 15 to cause the processing circuitry to perform one or more operations, those operations including an instance of the metadata access operation. In addition to the instance of the metadata access operation, a number of other operations may be performed. For instance, in one example arrangement an address generation operation will also be performed prior to performing the instance of the metadata access operation, the address generation operation being used to determine the address that will then be used by the metadata access operation. Further operations may also be needed, dependent on the type of access operations being performed. For example, when read operations are being performed, the read metadata items may be collated within a chosen register, such that after each instance of the metadata access operation is performed, the metadata items read by that particular instance then need to be merged with any previously read metadata items within the register.

At step 165, after the various operations have been performed at step 160 it is determined whether the iteration count N is greater than or equal to X/Y. If not, then the iteration count N is incremented at step 170 and the process returns to 160. However, once it is determined that the iteration count N is greater than or equal to X/Y, then the process proceeds to step 175, where the process ends. At this point, it is known that all of the X metadata items have been accessed. Hence, whilst reliance on the "minimum number of metadata items accessed" constraining information may result in more access operations being performed than are strictly needed, it will be known that by the time the process of FIG. 3 completes, all of the metadata items required will have been accessed. Furthermore, this will have been achieved without the debugger needing to interrogate the processing circuitry for progress. The process of interrogating the processing circuitry to determine progress can significantly impact performance, and accordingly by avoiding completely the need to interrogate the processing circuitry, this can lead to a very efficient mechanism for accessing multiple items of metadata.

The reason that it is safe for all of the plurality of instances of the metadata access operation to be performed without the debugger interrogating the processing circuitry is due to the way in which the address for each instance of the metadata access operation is determined. In particular, in one example arrangement, between each performance of the step 160, the address will be adjusted based on the parameter Y. Alternatively a wrapping constraint may be placed on the address generated each time, as will be discussed later with reference to FIGS. 9A and 9B. Whilst this may mean that certain metadata items are accessed more than once during the performance of the plurality of instances of the metadata access operation, it will be guaranteed that all of the metadata items of interest will be accessed.

Figure 4:
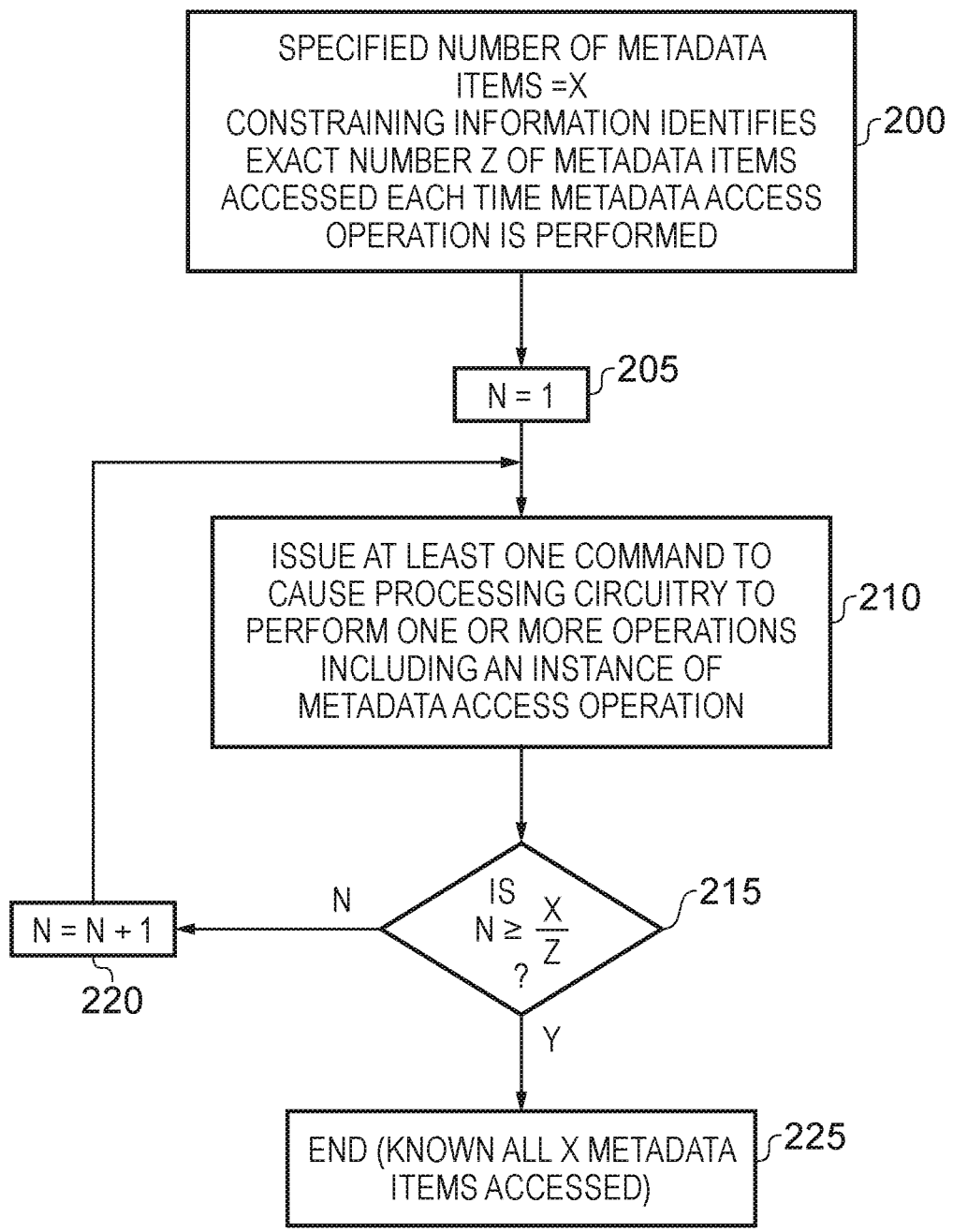

FIG. 4 is a flow diagram corresponding to FIG. 3, that where the constraining information identifies an exact number Z of metadata items accessed each time the metadata access operation is performed, as indicated by step 200. Steps 205, 210 correspond to steps 155, 160 of FIG. 3, and then at step 215 it is determined whether the iteration count N is greater than or equal to X/Z. If not, then the iteration count is incremented at step 220 and the process returns to step 210. However, once the condition at step 215 is met, the process ends at step 225 since at that point it is known that all of the X metadata items of interest have been accessed.

In one example arrangement, between each performance of step 210, the address is adjusted based on the parameter Z. Since the parameter Z indicates an exact number of metadata items that it is known will be accessed, only the required number of iterations will be performed, hence providing a further performance improvement over the approach of FIG. 3. Again, there is no need to interrogate the processor between each instance of the metadata access operation. Further, if instead the updated address produced by the metadata access operation is used to determine the address used by the next iteration, there is no need for a wrapping functionality constraint to be placed on the address generation, since it is known that only the minimum number of metadata access operations will be performed in order to access the required number of metadata items.

Figure 5:
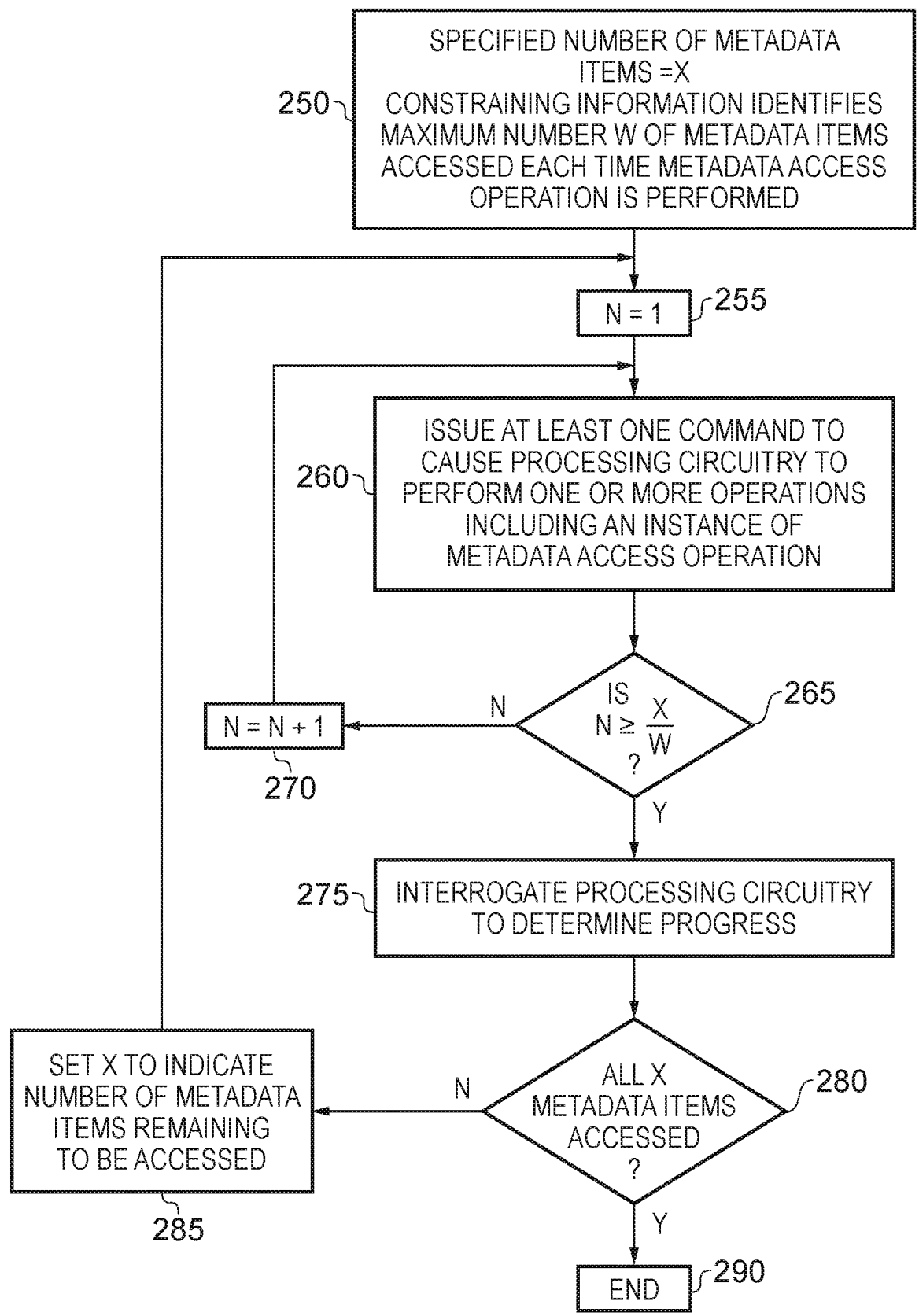

FIG. 5 illustrates another example arrangement, but where the constraining information identifies a maximum number W of metadata items accessed each time the metadata access operation is performed, as indicated by the box 250. Steps 255, 260, 265 and 270 correspond generally with steps 155, 160, 165, 170 of FIG. 3, but at step 265 the check performed is whether the iteration count is greater than or equal to X/W. Between each performance of step 260, the address may be adjusted based on the parameter W, or instead the earlier described wrapping functionality may be enforced to ensure that the addresses accessed stay within the address range associated with the metadata items of interest. As a third alternative, the updated address produced by the metadata access operation may be used to determine the address used by the next iteration. Since the whole FIG. 5 approach can be arranged to ensure that too many accesses are not performed, there may be no need for a wrapping functionality constraint to be placed on the address generation or to rely on address adjustment based on W.

However, in contrast to the approaches of FIGS. 3 and 4, the constraining information in this example is such that it cannot be guaranteed that all of the required items of metadata have been accessed by the time it is determined at step 265 that the iteration count N is greater than or equal to X/W. In particular, it is not known whether the maximum number W of metadata items will have been accessed each time the metadata access operation was performed. Accordingly, at step 275, the debugger is arranged to interrogate the processing circuitry in order to determine the progress in respect of accessing the metadata items. It is then determined at step 280 whether all of the required X metadata items have been accessed, and if so the process ends at step 290. However, if this is not the case, then the process proceeds to step 285 where the parameter X is set to indicate the number of metadata items remaining to be accessed, whereafter the process returns to step 255. It will be appreciated that, even though some interrogation of the processing circuitry is still required, there is no need to interrogate the processing circuitry between each instance of the metadata access operation, and accordingly this can still give rise to significant performance benefits.

In one example arrangement, the instruction set supported by the processing circuitry includes an instruction for bulk access of metadata items, execution of that instruction causing the earlier mentioned metadata access operation to be performed, that operation also being referred to herein as a Gettagblock operation for reading of metadata items or a Settagblock operation for writing to metadata items. FIG. 6A illustrates an example code sequence that includes a Gettagblock instruction within a loop, and which may be executed by the processing circuitry when in a normal, non-debug, mode of operation. The first three "register move (MOV)" instructions are used to set a base address to a pointer value, set the register Xaddr to the base address, and to initialise a tags register Xtags to all zeroes. The loop then includes a Gettagblock instruction, a "logical OR (ORR)" instruction and a "test (TST)" instruction. Execution of the Gettagblock instruction causes the Gettagblock operation to be performed in order to retrieve into a register Xtmp a number of metadata items obtained starting with the address in the Xaddr register. As indicated by the exclamation mark, the address value in the Xaddr register is then adjusted based on the number of metadata items retrieved. The ORR instruction is then executed in order to merge the values in the Xtmp register into the Xtags register. Over time, this enables all of the required metadata items (also referred to herein as tag values) to be accumulated within the Xtags register. The locations within the Xtags register populated each time the loop is performed can be determined by the processing circuitry using a certain number of low order bits of the address.

The test instruction then determines whether the address stored in the Xaddr register is the final expected address, i.e. the address that would be present after all of the required number of metadata items have been retrieved. If not, then a branch not equal (BNE) instruction is executed to cause the process to return to the start of the loop.

It may be the case that more metadata items need to be accessed than can be accommodated within a single Xtags register. In that event the entire sequence can be repeated one or more times with a further Xtags register.

From the above discussion, it will be seen that when the Gettagblock instruction is executed within the loop, the loop will be performed the required number of times until all of the required metadata items have been read.

FIG. 6B illustrates a debugger initiated command sequence that can be used to perform a similar process in the debug mode of operation. A first operation is performed to set a base address to a pointer value. The following sequence of commands is then repeated. A construct address command is issued in order to determine the address to be used for the current associated instance of the metadata access operation (the Gettagblock operation). In particular, it can be seen that the address is computed explicitly for the current iteration, by adding an offset value to the base address value to determine the address that is then stored in the Xaddr register. The Gettagblock operation is then performed using the address computed by the construct address operation. Although the processing circuitry would typically update the address in exactly the same way as it would have had the operation been initiated by execution of an instruction (i.e. in the manner discussed in FIG. 6A), in the example illustrated in FIG. 6B that updated address is not used. In particular, if the command sequence is performed again, then the construct address operation will be performed to recalculate the address to be used based on the base address and an offset value provided.

Finally, a merge operation is used to merge the read metadata items with the previous metadata items stored within the Xtags register. The three bottom commands illustrated in FIG. 6B can be reissued for each instance of the metadata access operation to be performed. The constraining information is used to determine a plurality of instances of the command sequence that can be issued without interrogating the processing circuitry. The constraining information is also used to determine the offset value used in order to generate the address for a current instance of the Gettagblock operation. As with the earlier discussion of FIG. 6A, some low order bits of the address can be used to indicate which locations in the Xtags register are updated using the contents in the Xtmp register during each iteration.

Figure 7A:
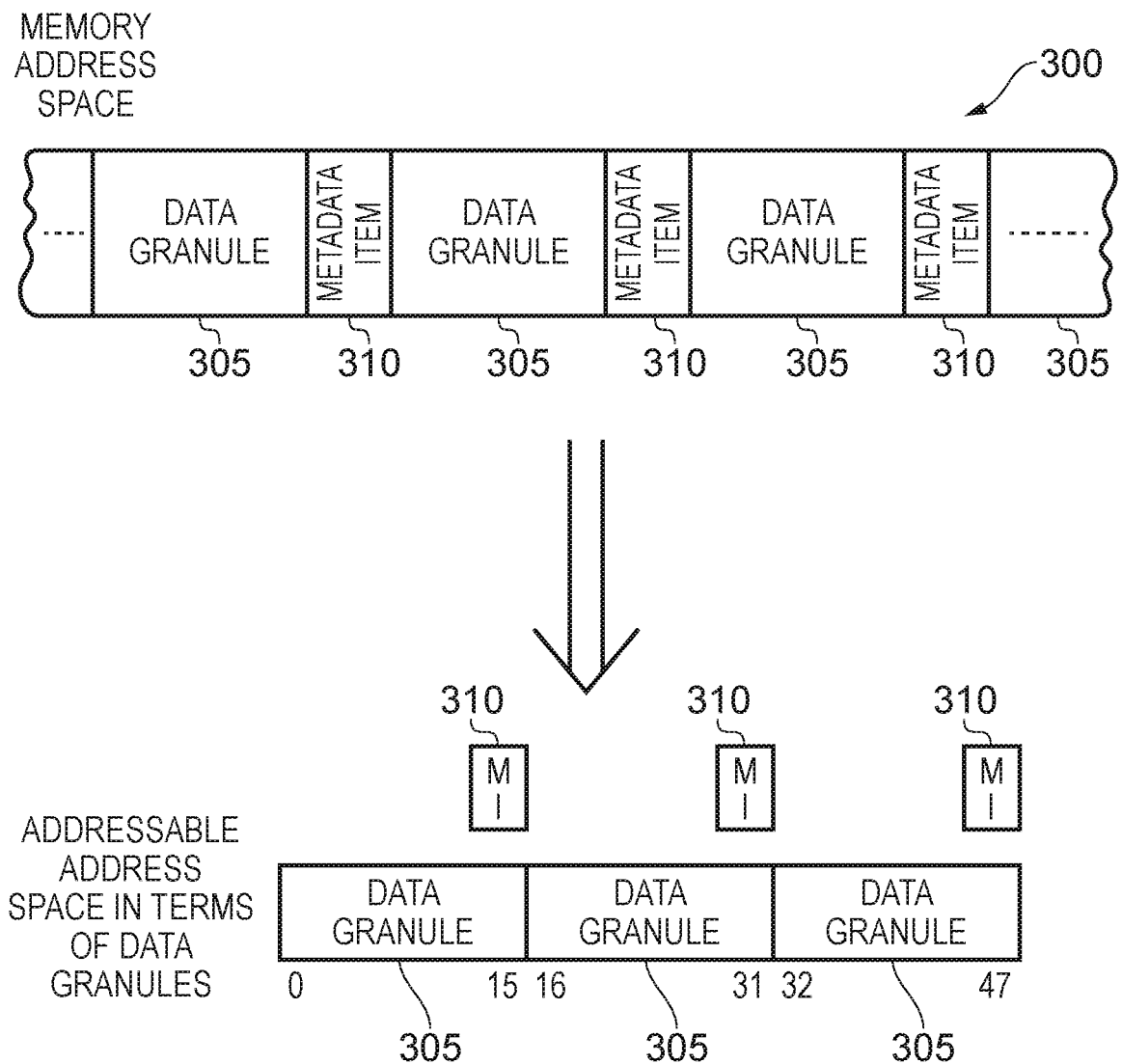

FIG. 7A illustrates the memory address space 300 and the presence of the various data granules 305 and associated metadata items 310 within that address space. However, in one example arrangement the metadata items themselves are not directly addressable, and accordingly can be viewed as semi-hidden. Instead, as illustrated in the lower figure in FIG. 7A, the addressable address space is specified in terms of the data granules. In this example, a byte address of 0 will cause the first data granule to be accessed, a byte address of 16 will cause the second data granule to be accessed, etc. However, metadata items 310 are associated with each data granule. Then, when the metadata access operation is used, whilst the address still identifies a data granule, that address can be used to identify the corresponding metadata item 310 of interest, and cause that metadata item to be accessed.

FIG. 7B illustrates two specific example forms of metadata items. In both examples, it is assumed that the data granules are 16 bytes in size, but in other implementations the data granule size can differ. In accordance with the capabilities example, each data granule of 16 bytes has an associated one bit of metadata, also referred to herein as a capability tag, which is used to identify whether the associated data granule identifies a capability, or merely identifies general purpose data.

The second example in FIG. 7B illustrates allocation tagging, where in the particular example shown 4 bits of metadata are associated with each 16 byte granule. These 4 bits of metadata can be referred to as allocation tags, also referred to herein as guard tags. When an access request is made to a particular location in memory, an address tag can be specified in association with the target address, and that address tag can be compared with the allocation tag associated with the relevant data granule in memory. Different actions can be taken dependent on whether a match is detected between the guard tag and the address tag.

FIG. 6B discussed earlier illustrated a debugger initiated command sequence that could be used to read a plurality of metadata items, using a Gettagblock operation. FIG. 8 illustrates another example command sequence that may be used to perform a write operation to multiple metadata items, using a Settagblock operation. As shown in FIG. 8, a first operation is performed to set an Xtags register with the metadata values that need to be written, and then a base address is set based on a pointer value. Thereafter a command sequence is provided that includes two commands, the first being a construct address command to identify the address to be used, and the next being a Settagblock command used to cause a Settagblock operation to be performed using the address determined by performance of the construct address operation. As with FIG. 6B, it can be seen that the address is computed explicitly for the current iteration. The Settagblock operation causes a number of tag values in the Xtags register to be written to associated metadata item locations determined using the address in the Xaddr register. Whilst the address may be updated by the processing circuitry based on performance of the Settagblock operation, to take into account the number of metadata items that have been written to, in accordance with the example of FIG. 8 that updated address is ignored since on the next iteration the address will be directly determined again based on the base address and an offset value. The construct address and Settagblock commands are reissued for each instance of the metadata access operation to be performed. The constraining information is used to determine a plurality of instances of the command sequence that can be issued without interrogating the processing circuitry, that constraining information also being used to determine the offset value for each iteration. As with the example of FIG. 6B, the low order bits of the address can be used by the processing circuitry to determine the location within the Xtags register referred to for each iteration. The actual address bits used for this purpose may depend on the data granule size.

Figure 9A:
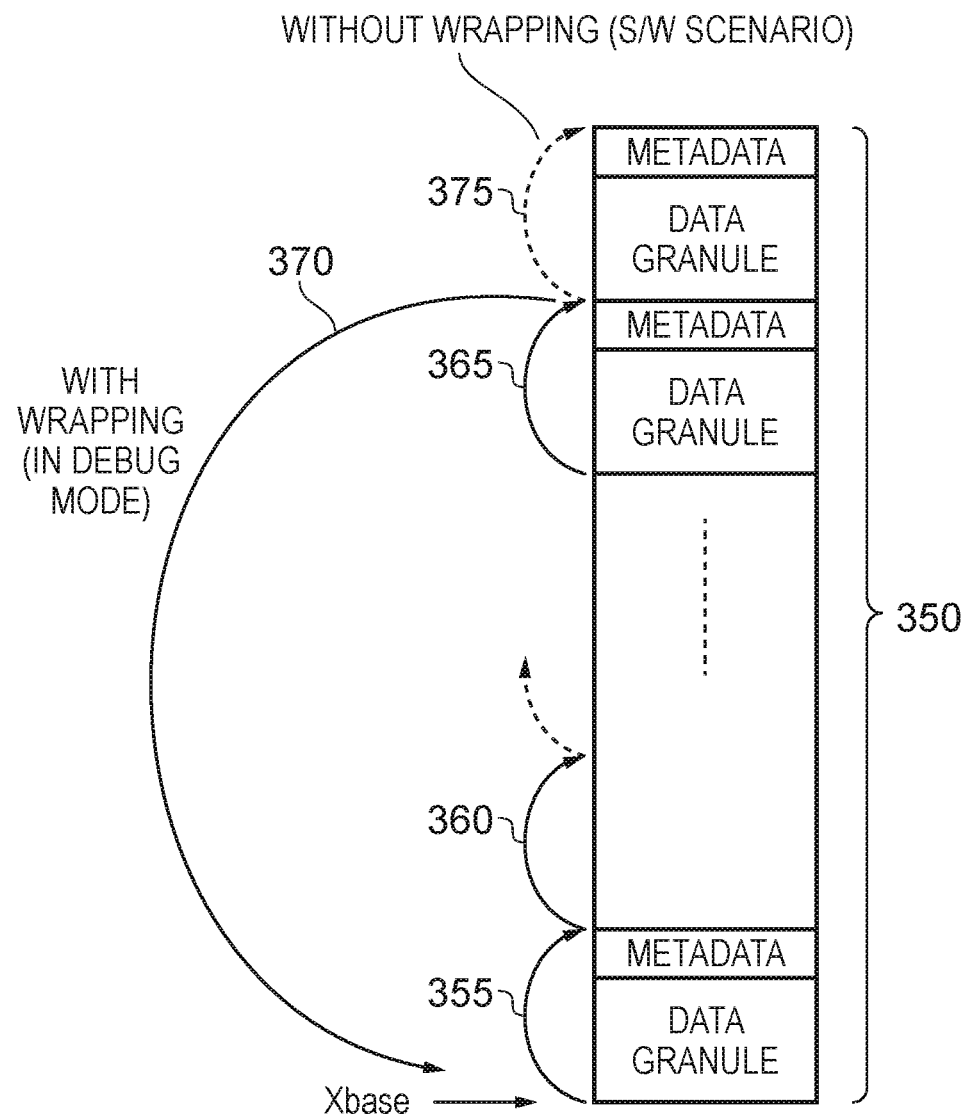

In the earlier discussed examples of FIG. 6B and FIG. 8, an explicit address generation operation is performed in association with each instance of the metadata access operation. However, in an alternative example arrangement, as will be discussed with reference to FIGS. 9A and 9B, it may be possible to omit the use of such an address generation operation and instead to make use of the automatically adjusted address produced by performance of the metadata access operation itself. As illustrated in FIG. 9A, the metadata items of interest will exist within an address space region 350. Each time the metadata access operation is performed by the processing circuitry, the processing circuitry will update the address based on the number of metadata items accessed, causing the address to be adjusted as illustrated schematically by the arrows 355, 360, 365. In this simple example, it is assumed that one metadata item is accessed each time, but it will be appreciated that a larger number of metadata items may in fact be accessed each time the metadata access operation is performed, and indeed it may be the case that the exact number accessed may differ between different iterations of the metadata access operation. In the normal non-debug mode of operation as discussed earlier with reference to FIG. 6A, such adjustments to the address will ultimately cause the address to be adjusted outside of the range 350, as indicated by the dotted arrow 375. In the software code approach this is fine as the loop testing will determine at that point that all of the required metadata items have been accessed, and hence performance of the loop will end.

However, when seeking to perform a similar process under debug control, the aim is to enable multiple instances of the metadata access operation to be performed without the debugger needing to interrogate the processing circuitry for progress, so as to improve performance of the debugging operation. However, it needs to be ensured that there is no prospect that metadata items outside of the desired address range 350 will be accessed during the performance of those plurality of instances of the metadata access operation. In one example arrangement, this is achieved by enforcing a wrapping functionality, as illustrated in FIG. 9A. In particular, when the top of the address range is reached, rather than the address being adjusted to an address outside of the range, the address will be adjusted as indicated schematically by the arrow 370 in order to wrap back to the start of the address range. As a result, it will be ensured that even if more instances of the metadata access operation are performed than would strictly be necessary, it can be ensured that only metadata items of interest will be accessed. This difference in functionality, dependent on whether the processing circuitry is being operated in debug mode (during which wrapping is enforced) or non-debug mode (where wrapping is not enforced), is illustrated schematically by way of example with reference to FIG. 9B. As can be seen by comparison of the two commands at the top of FIG. 9B with the three commands in FIG. 6B, the construct address command is no longer needed, hence reducing the number of commands required for each repetition of the metadata access operation. As shown by the first address incrementing sequence, where it is assumed that the address range 350 specifies a 1 Kbyte area of memory and 16 byte data granules, it can be seen that the addresses are adjusted each time based on the number of metadata items accessed. In this example, it is assumed that 8 metadata items are accessed during each performance of the metadata access operation. However, when the wrapping functionality is enforced (the debugger scenario), the address will wrap back to 0x1000, rather than being adjusted to 0x1400 as indicated in the lower case scenario (the software scenario).

As discussed earlier with reference to FIG. 1, a control register 55 can be provided which can be set under the control of the debugger so as to selectively enable and disable the wrapping functionality.

Figure 10:
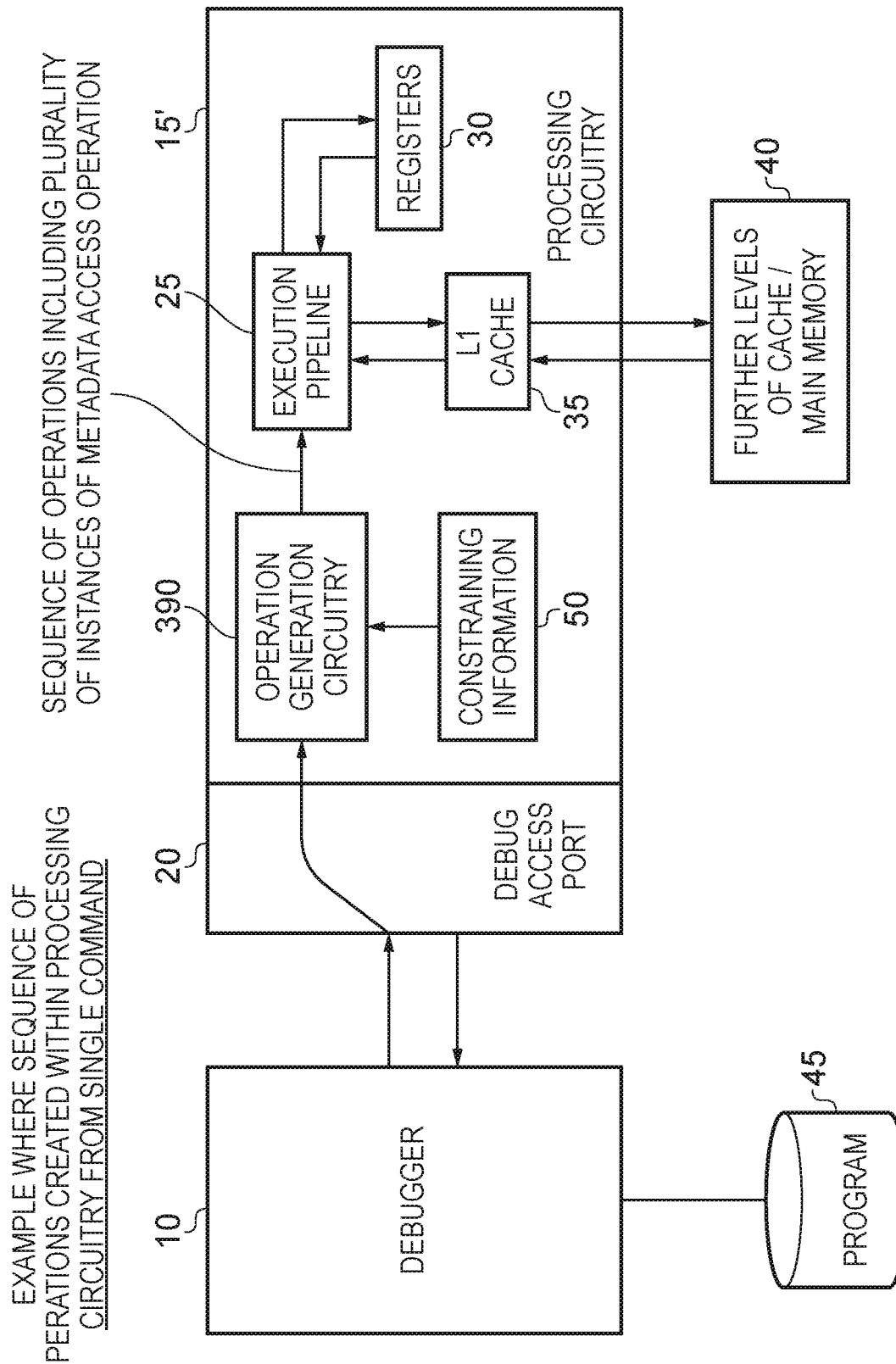
FIG. 10 illustrates a system in accordance with an alternative example arrangement where operation generation circuitry is incorporated within the processing circuitry to respond to at least one command from the debugger.

FIG. 10 provides an alternative example system to that shown in FIG. 1, where operation generation circuitry 390 is provided within the processing circuitry 15' to enable sequences of operations to be generated by the processing circuitry in response to one or more commands from the debugger 10. Hence, in this example the debugger does not itself need to specify the specific sequence of commands required to implement the plurality of instances of the metadata access operation. Instead, it may for example send a single command to the operation generation circuitry 390 via the debug access port, with the operation generation circuitry then referring to the constraining information 50 in order to determine the plurality of instances of the metadata access operation to be performed. In such an embodiment, there may be no need for any wrapping control functionality, since the operation generation circuitry can determine the correct number of iterations to be performed, and prevent overrun in the address generation.

Whilst in FIG. 10 the operation generation circuitry 390 is shown as having access to the constraining information 50, this is not a requirement and there are a number of ways in which the operation generation circuitry can be arranged to determine the number of instances of the metadata access operation to be performed. For example, it may be arranged to have dynamic access to information about the number of metadata items accessed each time the metadata access operation is performed (for example by having access to the updated address generated by performance of the metadata access operation), and to use that information to determine whether an additional one or more instances of the metadata access operation need to be performed.

Figure 11:
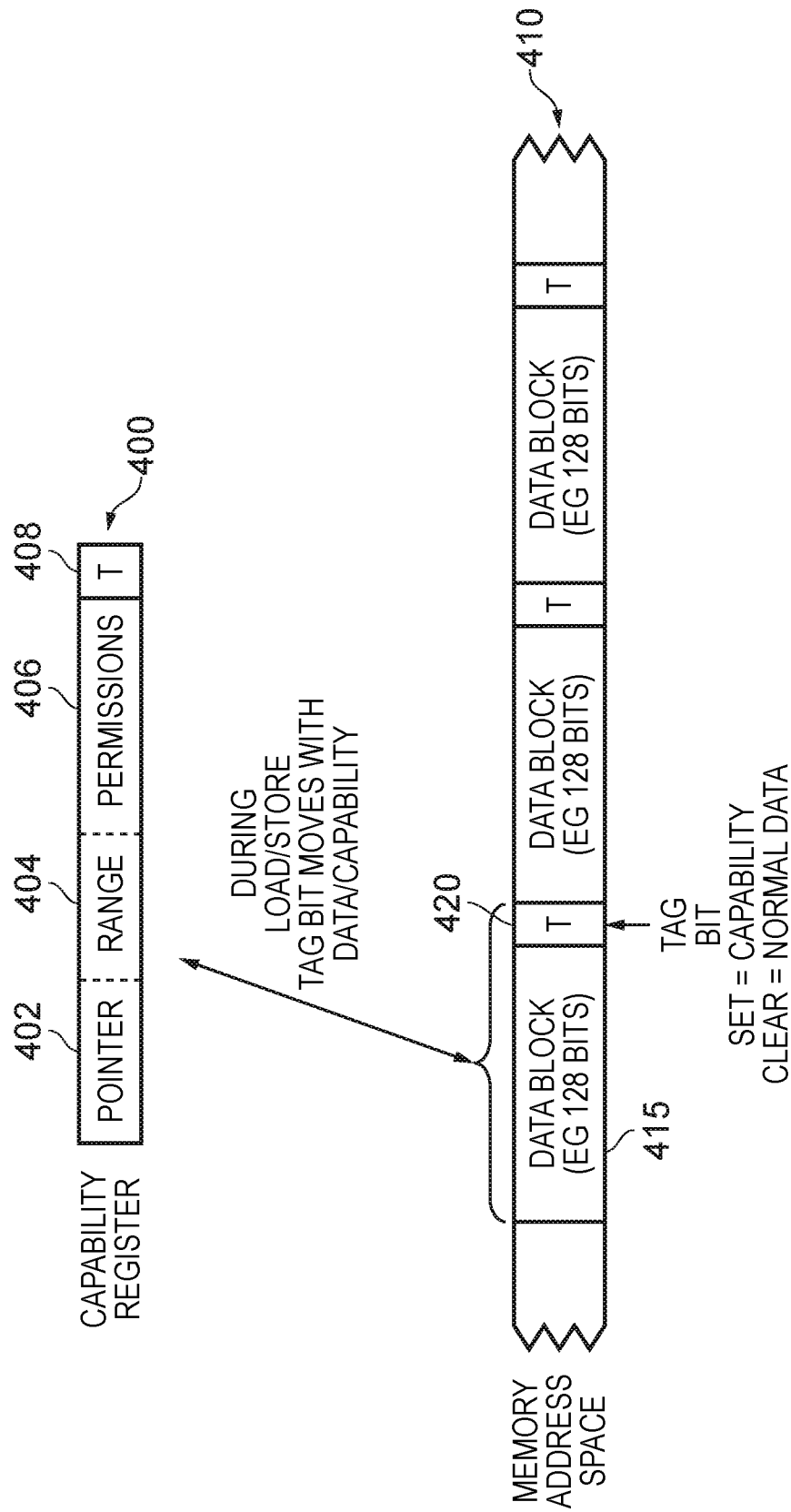
FIG. 11 illustrates an example arrangement where the metadata items are capability tags.
Figure 12:
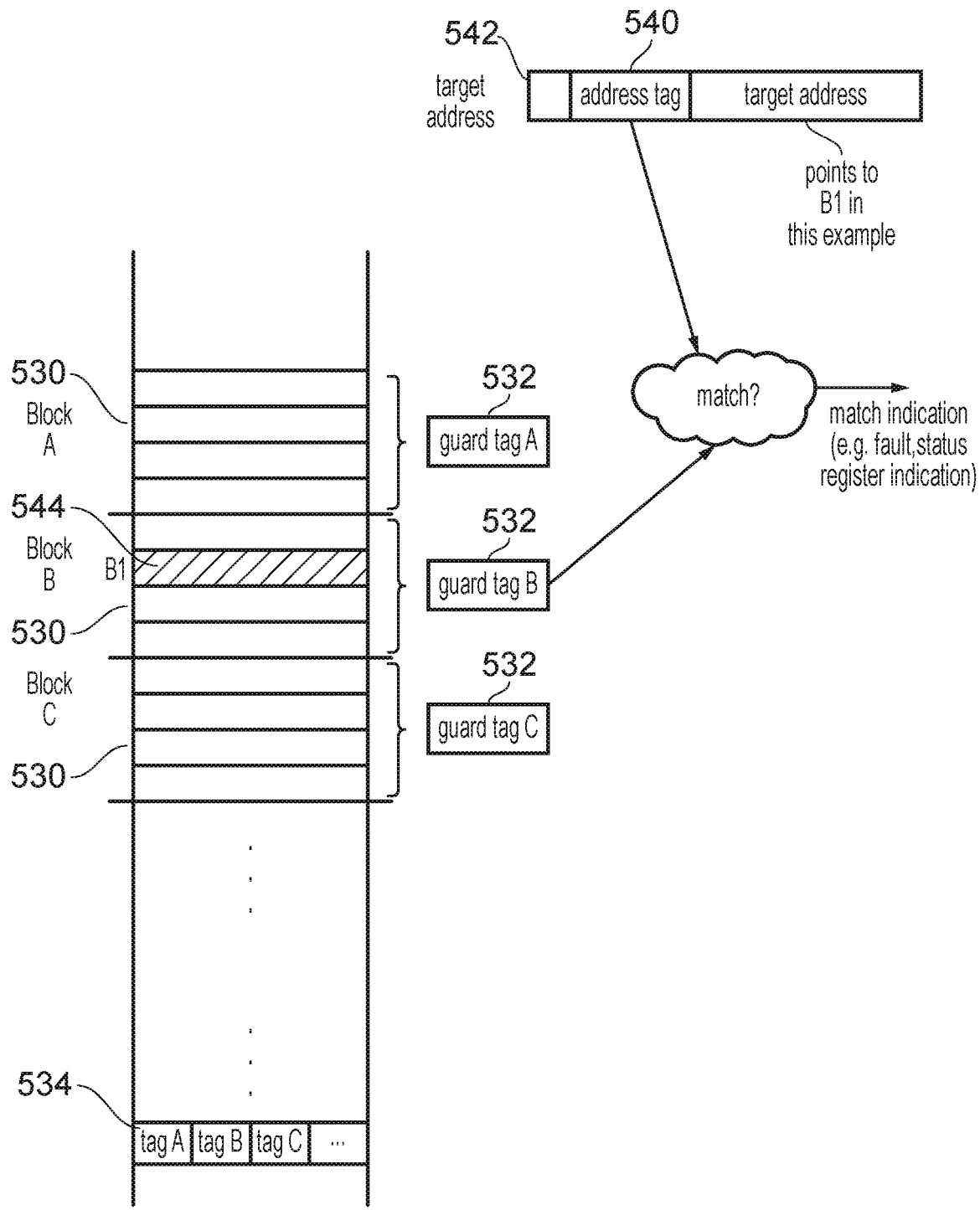
FIG. 12 illustrates another example arrangement where the metadata items are allocation tags.

The metadata items can take a variety of forms, but two examples are discussed hereafter with reference to FIGS. 11 and 12.

FIG. 11 schematically illustrates how a tag bit is used in association with individual data blocks to identify whether those data blocks represent a capability (in this case a bounded pointer and associated restrictions information), or represent normal data. In particular, the memory address space 410 in a capability-aware system may store a series of data blocks 415, which typically will have a specified size. Purely for the sake of illustration, it is assumed in this example that each data block comprises 128 bits. In association with each data block 415, there is provided a tag field 420, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into a bounded pointer register (also referred to herein as a capability register), such as the capability register 400 shown in FIG. 11, then the tag bit moves with the capability information. Accordingly, when a capability is loaded into the capability register 400, the pointer 402, range information 404 and restrictions information 406 (also referred to as the permissions information) will be loaded into the capability register. In addition, in association with that capability register, or as a specific bit field within it, the tag bit 408 will be set to identify that the contents represent a capability. Similarly, when a capability is stored back out to memory, the relevant tag bit 420 will be set in association with the data block in which the capability is stored. By such an approach, it is possible to distinguish between a capability and normal data, and hence ensure that normal data cannot be used as a capability.

As another example of metadata items to which the present techniques can be applied, FIG. 12 schematically illustrates a concept of tag-guarded memory accesses (guard tags also being referred to herein as allocation tags). The physical address space used to refer to memory locations within the memory system may be logically partitioned into a number of blocks 530 each comprising a certain number of addressable locations. For conciseness, in the example of FIG. 12, each block 530 comprises four memory locations, but other block sizes could be used as well. Each block 530 is associated with a corresponding guard tag 532. The guard tags associated with a certain number of blocks 530 can be gathered together and stored either within a different architecturally accessible memory location 534 within the physical address space, or within additional storage locations provided in main memory which are not architecturally accessible (not mapped to the same physical address space). The use of separate non-architecturally accessible storage may in some cases be preferred to avoid using up space in data caches for caching guard tag values, which could impact on the performance of the regular code and could make coherency management more complex. An additional tag cache could be provided in the processing circuitry 15 for caching tag values from the non-architecturally accessible storage, for faster access than if the tags had to be accessed from main memory.

The particular mapping of which tag storage locations 534 correspond to each block 530 may be controlled by the load/store unit of the processing circuitry 15 and could be hardwired or could be programmable. Alternatively the memory system 40 may determine where the tags are stored and the processing circuitry need not know or care. While in FIG. 12 each tag 532 is associated with a block of physical addresses, it would also be possible to provide guard tags 532 associated with virtual memory locations in a virtual memory address space, but this may require some additional address translations on each memory access. Hence by associating the guard tag 532 with physical memory locations this can improve performance. In general it is a choice for the particular implementation exactly how the guard tags 532 are associated with the corresponding blocks 530 of the physical address space. In general, all that is required is that the guard tag 532 associated with a given block of memory can be accessed and compared.

Hence, when a tag-guarded memory access is required, an address tag 540 (which is associated with the target address 542 identifying the addressed location 544 to be accessed), is compared against the guard tag 532 which is associated with the block of memory locations 530 which includes the addressed location 544. For example, in FIG. 12 the target address 542 points to a certain location B1 in memory, marked 544 in the address space of FIG. 12. Therefore the guard tag B which is associated with the block of locations B including location B1 is compared against the address tag 540 associated with a target address 542. As shown in the top of FIG. 12, the address tag 540 may be determined as a function of selected bits of the target address itself. In particular, the address tag may be determined from bits within a portion of the target address which is unused for indicating the specific memory location which is to be selected as the addressed location 544. For example, in some implementations the top portion of bits of the target address may always have a certain fixed value such as a sign extension (all 0s or all 1s) and so an address can be tagged with the address tag 540 by overwriting these unused bits with an arbitrary tag value. The particular address tag value can be selected by a programmer or compiler for example. The address tag and guard tag 532 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, the load/store unit of the processing circuitry 15 compares the address tag 540 and the guard tag 532 associated with a block 530 including the addressed location 544, and determines whether they match (alternatively the tag comparison may be performed within the memory system 40). The load/store unit generates a match indication indicating whether the address tag 540 and the guard tag 532 matched. For example, this match indication could be a fault signal which is generated if there is a mismatch between the address tag 540 and the guard tag 532, or an indication placed in a status register indicating whether there was a match, or an entry added to an error report to indicate the address for which the error was detected and/or the instruction address of the instruction which triggered the error.

From the above described examples, it will be appreciated that the described techniques enable a significant improvement in the efficiency of accessing multiple metadata items during the performance of debugging operations by a debugger. In particular, the degree to which the debugger needs to interrogate the processing circuitry to determine progress in the number of metadata items accessed can be significantly reduced, and in some instances completely avoided, thereby significantly improving efficiency.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A method of operating a debugger to debug a program to be executed on processing circuitry, the processing circuitry operating on data formed of data granules having associated metadata items, the method comprising:
deciding to access a specified number of metadata items, where the specified number is such that a metadata access operation needs to be performed by the processing circuitry multiple times in order to access the specified number of metadata items; and
issuing at least one command to the processing circuitry to cause the processing circuitry to perform a plurality of instances of the metadata access operation in order to access at least a subset of the specified number of metadata items, where the number of metadata items accessed by each instance of the metadata access operation is non-deterministic by the debugger from the metadata access operation, and the at least one command is such that the plurality of instances of the metadata access operation are performed by the processing circuitry without the debugger interrogating the processing circuitry between each instance of the metadata access operation to determine progress in the number of metadata items accessed.

2. A method as claimed in claim 1, wherein at least one access indicator is provided to indicate constraining information about a number of metadata items accessed by each instance of the metadata access operation, and the plurality of instances of the metadata access operation performed in response to the at least one command is determined with reference to the at least one access indicator.

3. A method as claimed in claim 2, wherein the at least one access indicator is sufficient to enable the at least one command issued by the debugger to the processing circuitry to cause the processing circuitry to perform, as the plurality of instances of the metadata access operation, a sufficient number of instances of the metadata access operation to access all of the specified number of metadata items.

4. A method as claimed in claim 3, wherein the at least one access indicator provides a generic minimum indication non-specific to implementation details of the processing circuitry, and indicates a minimum number of metadata items accessed by each instance of the metadata access operation.

5. A method as claimed in claim 3, wherein the at least one access indicator provides an implementation minimum indication for the processing circuitry, and indicates a minimum number of metadata items accessed by each instance of the metadata access operation.

6. A method as claimed in claim 3, wherein the at least one access indicator provides an exact indication of the number of metadata items accessed by each instance of the metadata access operation.

7. A method as claimed in claim 2, wherein the at least one access indicator provides an implementation maximum indication for the processing circuitry, and indicates a maximum number of metadata items accessed by each instance of the metadata access operation.

8. A method as claimed in claim 7, wherein:
the at least one command issued by the debugger to the processing circuitry causes the processing circuitry to perform, as the plurality of instances of the metadata access operation, a number of instances M, where M is equal to the specified number of metadata items divided by the maximum number of metadata items accessed by each instance of the metadata access operation; and
when the processing circuitry has performed the plurality of instances of the metadata access operation, the debugger is arranged to interrogate the processing circuitry to determine progress in the number of metadata items accessed, in order to determine whether further instances of the metadata access operation are required.

9. A method as claimed in claim 1, wherein the at least one command issued by the debugger causes an address to be determined by the processing circuitry for each instance of the metadata access operation, the address being used to identify one or more metadata items accessed during performance of the associated instance of the metadata access operation.

10. A method as claimed in claim 2, wherein:
the at least one command issued by the debugger causes an address to be determined by the processing circuitry for each instance of the metadata access operation, the address being used to identify one or more metadata items accessed during performance of the associated instance of the metadata access operation; and
the address for each instance of the metadata access operation is determined having regard to the at least one access indicator.

11. A method as claimed in claim 9, wherein the at least one command comprises a command sequence for each instance of the metadata access operation, the command sequence identifying a sequence of operations comprising at least the corresponding instance of the metadata access operation, and an address generation operation to determine the address to be used by the corresponding instance of the metadata access operation.

12. A method as claimed in claim 9, wherein:
an address space region is identified based on the specified number of metadata items to be accessed;
during performance of a current instance of the metadata access operation instigated by the debugger, the processing circuitry is arranged to generate an updated address to be used as the address for a next instance of the metadata access operation, the updated address being generated by modifying the address used by the current instance to take into account the number of metadata items accessed by the current instance, but employing a wrapping function to wrap from one end of the address space region to another end of the address space region as required to ensure that the updated address remains within the address space region.

13. A method as claimed in claim 12, wherein in a non-debug mode of operation of the processing circuitry, performance of the metadata access operation causes the processing circuitry to perform the metadata access operation such that, when generating the updated address, the wrapping function is disabled.

14. A method as claimed in claim 12, wherein the debugger is arranged to set a control storage element within the processing circuitry to selectively disable the wrapping function.

15. A method as claimed in claim 1, wherein the at least one command comprises one or more commands for each instance of the metadata access operation.

16. A method as claimed in claim 1, wherein the at least one command issued by the debugger is processed by operation generation circuitry within the processing circuitry, in order to create the operations required for the processing circuitry to perform the plurality of instances of the metadata access operation.

17. A method as claimed in claim 1, wherein performance of the metadata access operation by the processing circuitry the multiple times causes the specified number of metadata items to be retrieved and stored into a chosen register.

18. A method as claimed in claim 1, wherein performance of the metadata access operation by the processing circuitry the multiple times causes values of the specified number of metadata items to be updated using metadata values stored in a chosen register.

19. A method as claimed in claim 17, wherein the specified number of metadata items is determined by the number of metadata items that can be stored in the chosen register.

20. A method as claimed claim 1, wherein each metadata item comprises one or more bits.

21. A method as claimed claim 1, wherein each metadata item is a capability tag identifying whether the associated data granule specifies a capability.

22. A method as claimed claim 1, wherein each metadata item is an allocation tag identifying an allocation policy of the associated data granule.

23. A computer program product comprising a non-transitory machine-readable storage medium on which is stored program instructions which, when executed by a computer processor, cause the computer processor to operate as a debugger to perform a method of debugging a program to be executed on processing circuitry, the processing circuitry operating on data formed of data granules having associated metadata items, the method comprising:
  deciding to access a specified number of metadata items, where the specified number is such that a metadata access operation needs to be performed by the processing circuitry multiple times in order to access the specified number of metadata items; and
  issuing at least one command to the processing circuitry to cause the processing circuitry to perform a plurality of instances of the metadata access operation in order to access at least a subset of the specified number of metadata items, where the number of metadata items accessed by each instance of the metadata access operation is non-deterministic by the debugger from the metadata access operation, and the at least one command is such that the plurality of instances of the metadata access operation are performed by the processing circuitry without the debugger interrogating the processing circuitry between each instance of the metadata access operation to determine progress in the number of metadata items accessed.

* * * * *